United States Patent [19]

Jeffers

[11] Patent Number: 5,465,219

[45] Date of Patent: Nov. 7, 1995

[54] COMBUSTION ANALYZER BASED ON CHAOS THEORY ANALYSIS OF FLAME RADIATION

[75] Inventor: Larry A. Jeffers, Washington Township, Stark County, Ohio

[73] Assignee: The Babcock & Wilcox Company, New Orleans, La.

[21] Appl. No.: 109,119

[22] Filed: Aug. 19, 1993

[51] Int. Cl.[6] .................................................... G01J 3/00
[52] U.S. Cl. ........................... 364/498; 364/496; 431/14
[58] Field of Search ................................. 364/496, 497, 364/499, 498; 431/14

[56] References Cited

U.S. PATENT DOCUMENTS 4,644,173  2/1987  Jeffers ..................................... 250/554
5,249,954  10/1993  Allen et al. .............................. 431/14

OTHER PUBLICATIONS

Gorman et al., "Real–Time Identification of Flame Dynamics" Applied Chaos, 1992 pp. 261–276.

Stringer, J; "Is Fluidized Bed a Chaotic Dynamic System?," Proceedings of the 10th International Conference on Fluidized Bed Combustion, San Francisco, Calif., Apr. 30–May 3, vol. 1, pp. 265–272, 1989.

Daw, C. S. & Halow, J. S. "Modeling Deterministic Chaos in Gas–Fluidized Beds", Presented at the American Institute of Chemical Engineers Annual Meeting, Los Angeles, Calif., Nov. 17–22, 1991, Entire Paper.

Daw, C. S., Thomas, J. F. & Richards, G. A.; "Modeling Deterministic Chaos in Thermal Pulse Combustion", Presented at the Central States Section 1992 Spring Technical Meeting at the Combustion Institute, Apr. 27–28, 1992, Entire Paper.

Broomhead, D. S. & King, G. P., "Extracting Qualitative Dynamics From Experimental Data", Physica 200, 1986, pp. 217–236.

Grassberger, P. & Procaccia, Itamar "Estimation of the Kolmogorov Entropy from a Chaotic Signal", Physical Review A, vol. 28, No. 4, Oct. 1983, pp. 2591–2593.

Fraser, A. & Swinney, "Independent Coordinates for Strange attractors from Mutual Information", Dept. of Pysics, Society, pp. 1134–1140.

Flynn, T. J. & Fuller, T. A. "Application of Chaotic Time Series Prospectus"—EPRI, The B&W Co.: R&D Division, May, 1993, Alliance, Ohio Entire Paper.

Douglas, John, "Seeking Order in Chaos", EPRI Journal, Jun., 1992 pp. 5–13.

Eckman, J. P., "Ergodic theory of Chaos and Strange Attractors," Reviews of Modern Pysics, vol. 57, No. 3, Part 1, Jul., 1966, The American Physical Society, 1965, pp. 617–657.

Daw, C. S. & Halow, J. S., "Characterization of Viodage and Pressure Signals from Fluidized Beds Using Deterministic Chaos Theory," Fluidized Bed Combustion, ASME 1991-777-86.

Ditto, William & Pecora, "Mastering Chaos, "Scientific American, Aug., 1993, pp. 78–84.

H. D. I. Abarbanel, et al. in "Computing the Lyapanov Spectrum of a Dyanmical System from an Observed Time Series"; Physical Review A, Mar. 15, 1991, vol. 43, No. 6, pp. 2787–2806.

*Primary Examiner*—Emanuel T. Voeltz
*Assistant Examiner*—M. Kemper
*Attorney, Agent, or Firm*—Robert J. Edwards; Eric Marich

[57] ABSTRACT

A method and apparatus of analyzing a burner flame comprises accumulating raw data such as radiate energy from the burner flame. A power spectrum and mutual information curve are generated from the raw data. A multi-dimensional attractor is also generated using the raw data which is analyzed in comparison to random data to determine whether the raw data is chaotic in nature. If the raw data is chaotic in nature, a Lyapunov exponent, Kolmogorov entropy or cross section of a chaotic attractor can be utilized as a measure of the quality of the flame and further used to control one or more parameters of the burner to adjust the flame.

15 Claims, 8 Drawing Sheets

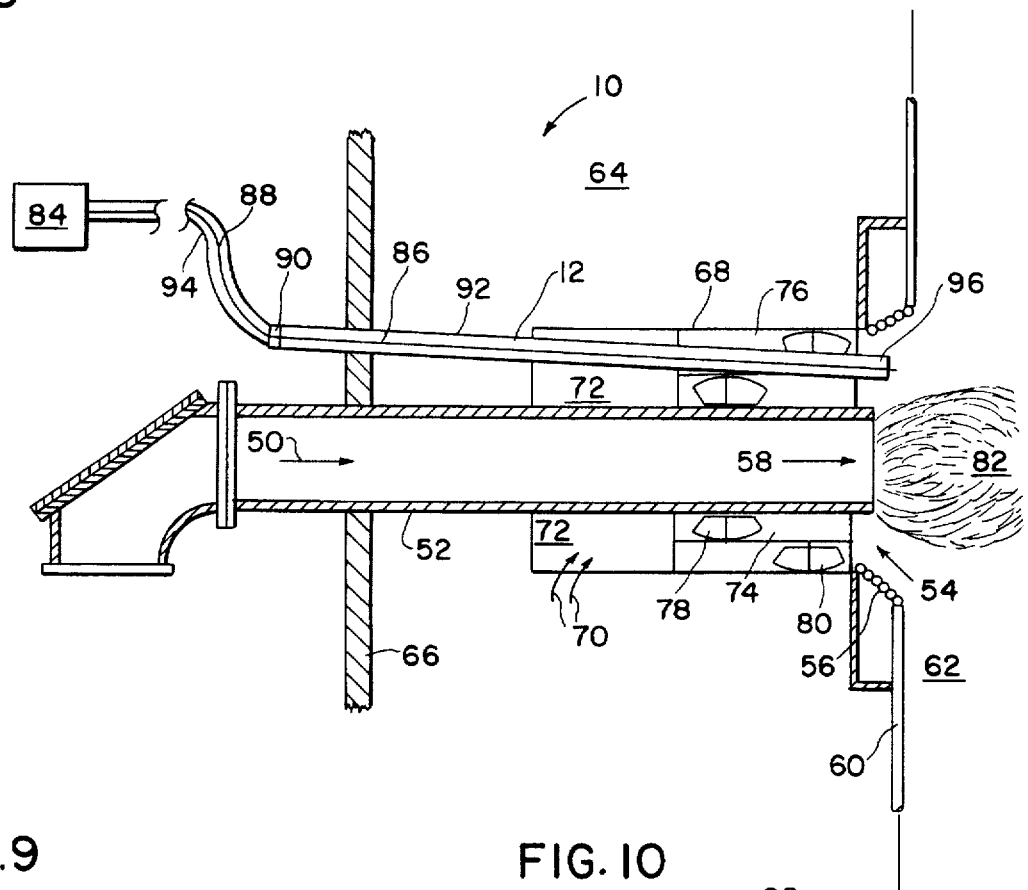
FIG. 8
FIG. 9
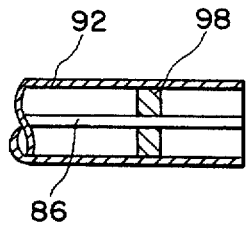
FIG. 10
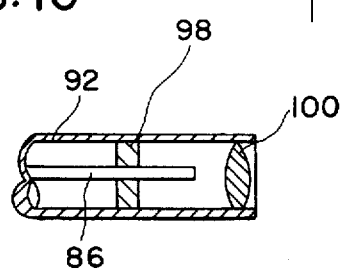
FIG. 11
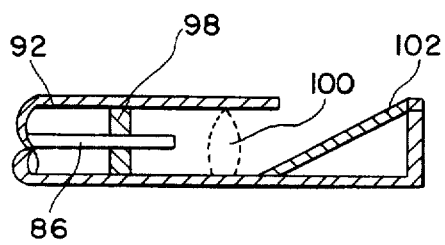
FIG. 12
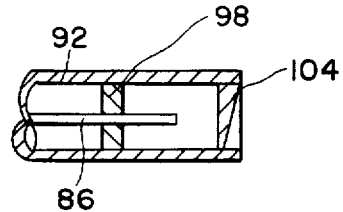

5,465,219

COMBUSTION ANALYZER BASED ON CHAOS THEORY ANALYSIS OF FLAME RADIATION

FIELD AND BACKGROUND OF THE INVENTION

The present invention relates in general, to flame-monitoring equipment and, in particular, to a new and useful combustion analyzer which is based on chaos theory analysis.

A key variable in the combustion of fossil fuels, such as oil, gas, or pulverized coal, is the air/fuel (A/F) ratio. The A/F ratio strongly influences not only the efficiency of fuel usage but also the emissions produced during the combustion process (especially $NO_x$), and also affects the slagging, fouling, and corrosion phenomena occurring in the combustion zone.

In current fossil/fueled steam generator practice, the A/F ratio is controlled based on a measurement of the oxygen and/or carbon monoxide (CO) concentration in the stack gases, taken at a location downstream of the furnace where the actual combustion process takes place. Unfortunately, in the furnaces of multi-burner steam generators, the A/F differs from burner to burner, and varies significantly with location within the flame of any given burner. Since both the combustion efficiency and $NO_x$ generation levels depend on the localized values of the A/F ratio (i.e., the distribution and mixing within each flame) the measurement and control of a global A/F ratio produced by the entire furnace of the steam generator does not insure optimum performance.

The overall burner A/F ratio and its distribution within the flame is currently set for each burner during start-up in a laborious, iterative procedure that is based upon visual observations of the burner flame and which strongly depends on the experience and judgement of the start-up engineer. During subsequent steam generator operation, a large variety of factors can lead to changes in the A/F ratio and its distribution, with concomitant changes in $NO_x$ emissions, combustion efficiency, etc.

Among the factors that can alter the originally set A/F ratio are:

coal pulverizer wear leading to a change in the size distribution of the coal particles;

change in the overall fuel flow rate from the pulverizer;

change in the distribution among burners of the fuel flow;

change in the distribution of fuel within the flame due to erosion/corrosion of the impeller or conical diffuser;

change in the overall air flow rate;

change in the distribution of air among individual burners; and change in the distribution of air within a given burner due to changes in the positions of air registers.

Flame quality analyzers are known; see U.S. Pat. No. 4,644,173, to Jeffers for an example of one known flame quality analyzer system.

Satisfactory methods for the continuous monitoring of A/F ratio distribution and the contributing factors listed above are not currently available.

Chaos theory has been used in the academic community for some time. Few practical uses of this theory exist, however.

Two references that provide a good history and general background of chaos analysis are: (1) Gleick, *Chaos: Making a New Science*, Viking Press, New York, 1987, and (2) Stewart, I., *Does God Play Dice? The Mathematics of Chaos*, Basil Blackwell Inc., New York, 1989. Some good definitive papers on the application of deterministic chaos are (3) Stringer, J., "Is a Fluidized Bed a Chaotic System?," Proceedings of the 10th International Conference on Fluidized Bed Combustion, San Francisco, Calif., Apr. 30-May 3, 1989, Volume 1, pp. 265–272 and (4) Daw, C. S. and Halow, J. S., "Modeling Deterministic Chaos in Gas Fluidized Beds," presented at the American Institute of Chemical Engineers Annual Meeting, Los Angeles, Calif., Nov. 17–22, 1991, and (5) Daw, C. S., Thomas, J. F., and Richards, G. A., "Modeling Deterministic Chaos in Thermal Pulse Combustion," Presented at the Central States Section 1992 Spring Technical Meeting at the Combustion Institute, Apr. 27–28, 1992. Stringer presents a good overview of the terminology associated with deterministic chaos. (6) H. D. I. Abarbanel, et al., in "*Computing the Lyapunov Spectrum of a Dynamical System from an Observed Time Series,*" Physical Review A, Mar. 15, 1991, Volume 43, Number 6, pp. 2787–2806, has developed the mathematical algorithms to reduce and interpret experimental data, as well as to make predictions regarding a system's behavior.

SUMMARY OF THE INVENTION

A primary objective of the present invention is to apply chaos theory to the field of combustion analysis to provide a new and useful method and apparatus for analyzing flame radiation.

Accordingly, one aspect of the present invention is drawn to a method of analyzing a burner flame comprising: accumulating raw data representing at least one characteristic of the flame, over time; calculating a power spectrum distribution for the raw data; calculating a mutual information curve for the raw data; calculating a multi-dimensional attractor from the raw data using principal components analysis; calculating the Lyapunov exponents for each dimension of the attractor for providing an indication of a rate of divergence of trajectories of the attractor; calculating Kolmogorov entropy to provide an indication of the ability to make detail predictions concerning the raw data, positive values for the Kolmogorov entropy indicating strong chaotic behavior; taking at least one cross section of the chaotic attractor at at least two different locations as a quantitative measure of the chaotic attractor; at least one of Lyapunov exponents, Kolmogorov entropy and cross section of the attractor being a signal indicative of flame quality; transmitting the signal to a display means for viewing by an operator; and using the displayed signal to analyze the burner flame.

Another aspect of the present invention is drawn to an apparatus for analyzing combustion of a flame based on chaos theory analysis, comprising: means for accumulating raw data representing at least one characteristic of the flame, over time; means for calculating a power spectrum distribution for the raw data; means for calculating a mutual information curve for the raw data; means for calculating a multi-dimensional attractor from the raw data using principal components analysis; means for calculating the Lyapunov exponents for each dimension of the attractor for providing an indication of a rate of divergence of trajectories of the attractor; means for calculating a Kolmogorov entropy to provide an indication of the ability to make detail predictions concerning the raw data, positive values for the Kolmogorov entropy indicating strong chaotic behavior; means for taking at least one cross section of the chaotic attractor at at least two different locations as a quantitative measure of the chaotic attractor; and means for displaying said quantitative measure of the chaotic attractor for viewing by an operator.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 8 is a schematic representation of a known burner using a probe which can be used in accordance with the present invention; and FIGS. 9, 10, 11, and 12 are various schematic representations of the end construction of the probe of FIG. 8.

DESCRIPTION OF THE PREFERRED EMBODIMENTS

As described above, local changes in the A/F ratio can result from a wide variety of root causes that in themselves are difficult or impossible to monitor. Fortunately, the radiant emission from localized areas within a flame is easily monitored and is a direct function of the local temperature and number density of unburned fuel particles. Since the temperature is a function of the local A/F ratio, the local radiant emission should be affected by any of the factors discussed previously, which affect the local A/F ratio.

The present invention applies chaos theory to measured optical emissions to extract the information about the other variables that is implicit in the optical emissions.

Apparatus of the Invention

Figure 1:
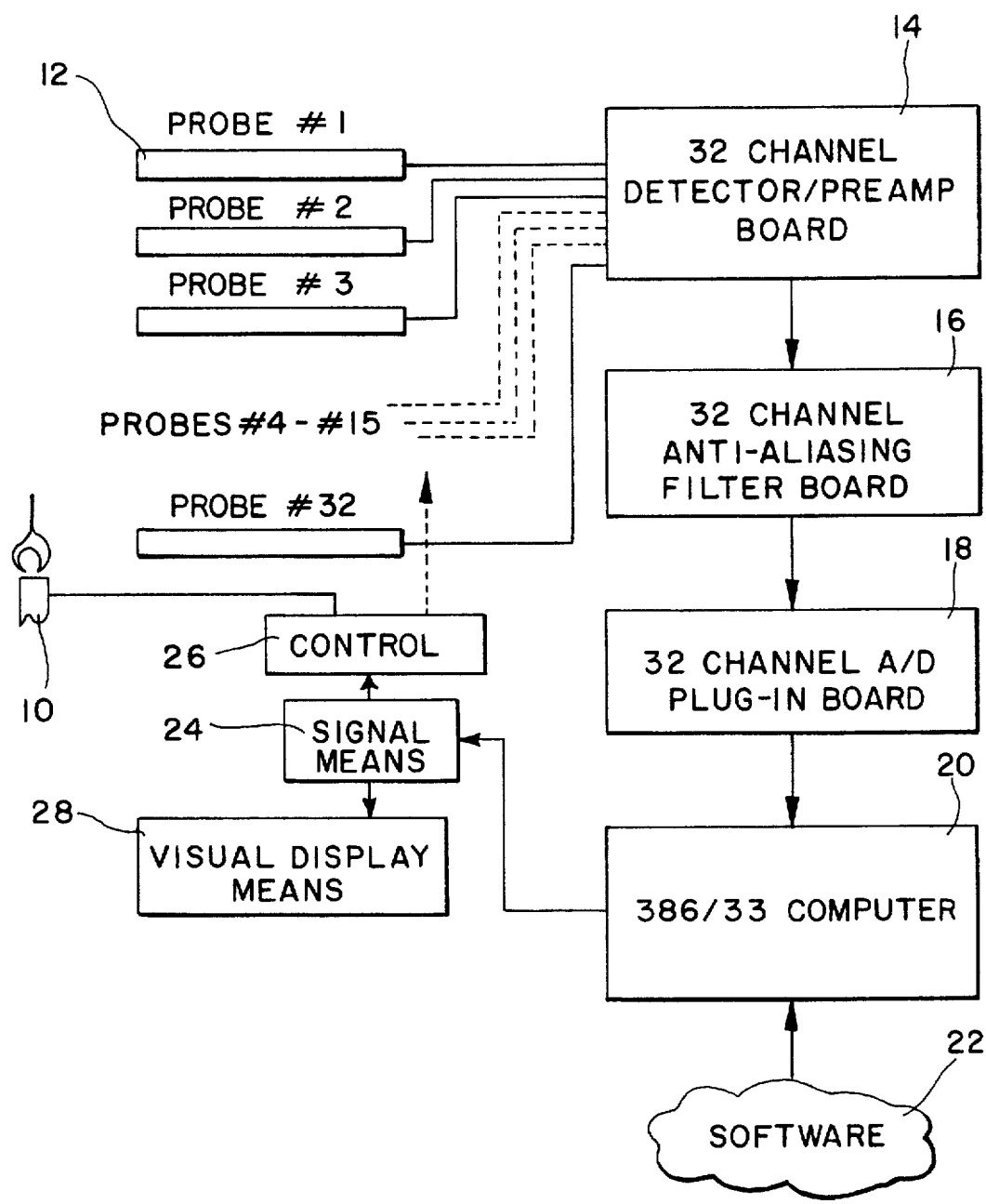
FIG. 1 is a block diagram showing an apparatus of the present invention.

Referring to the drawings generally wherein like numeral designate the same or similar elements throughout the several drawings and to FIG. 1 in particular, there is shown a block diagram of the equipment required for monitoring a fossil-fueled steam generator having as many as 32 burners 10. It is understood that a greater or fewer number of burners can be monitored by the present invention simply by changing the numbers of probes 12 and channels provided. The measured variable in the system is the radiant light emission from a localized position in the flame. The optimum position and size of area to be viewed must be determined empirically. The basic sensor for the proposed system consists of a fiber optic probe 12 (described infra) coupled to a silicon-photodiode for each burner, shown at #1 to #32.

In terms of data acquisition, the advantage of chaos time series analysis (CTSA) is that a nonlinear system's behavior can be characterized by measuring a single variable. The single variable must be measured at a frequency at least two orders of magnitude higher than the natural frequency of the system to capture the behavior of the system. For example, in an application to fluidized beds, pressure data was collected at approximately 200 Hz, compared to the natural frequency of a bubbling fluidized bed which is approximately 2 Hz.

The radiance from a coal flame, measured near the burner throat, has a characteristic fluctuation with time at a frequency around 5 to 20 Hz. This phenomenon has long been used in flame detectors (on/off detectors) for both oil and coal flames. The detectors for use in the subject invention are designed to respond to frequencies up to 50 Hz, and the sampling rate is correspondingly set to 5000 Hz.

The probes 12 send their signals to a 32 channel detector preamp board 14.

After passing through anti-aliasing filters 16, the detector signals are input to a high-speed analog-to-digital converter board 18 that is plugged into a 386/33 computer 20, programmed at 22, according to the invention.

Chaos analysis also requires that the data run contain enough total points to provide statistically meaningful analysis. A total of 50,000 points should be sufficient.

According to the invention, a quantitative signal is produced for each flame being monitored by computer 20 at signal means 24. This replaces empirical observations of skilled operators in the past, who simply viewed the flames from the burners to make various adjustments until the flame looked correct to the observer. The present invention provides a signal at signal means 24 which more quantitatively represents the quality of the flame and can be used in control means 26 to control one or more adjustment parameters of a burner shown schematically in FIG. 1, where the flame is "seen" by the probe 12. The results thus become more reproducible and do not rely on the skill of a particular worker, and do not have the possibility of inconsistent results depending on different workers having different perceptions. The signal means 24 also provides the signal which quantitatively represents the quality of the flame to a visual display means 28 for viewing by an operator.

Examples of parameters which can be controlled according to the present invention include overall fuel flow rate from the pulverizers, a change in distribution of fuel to the various burners, change of distribution of fuel within the flame of one burner, change in air flow rate, overall and to the individual burners, change in distribution of air in a given burner, for example by positioning an air register, and other adjustments which are known to the skilled artisans in this field.

Chaotic Time Series Data Reduction and Analysis Techniques

Many of the systems and processes one deals with on a regular basis are nonlinear in nature. Often these nonlinear systems and processes behave in an apparently random fashion. In truth, however, many apparently random processes contain inherent order or exhibit what is known as deterministic behavior. Traditional analysis techniques like Fourier analysis are incapable of providing much useful information about the true nature of apparently random processes. Chaos theory, on the other hand, provides a means to analyze signals that cannot be analyzed properly with traditional techniques. Chaotic time series analysis is a powerful new technique that allows one to extract useful information about the nature of nonlinear systems or processes that behave in a deterministic way.

Figure 2:
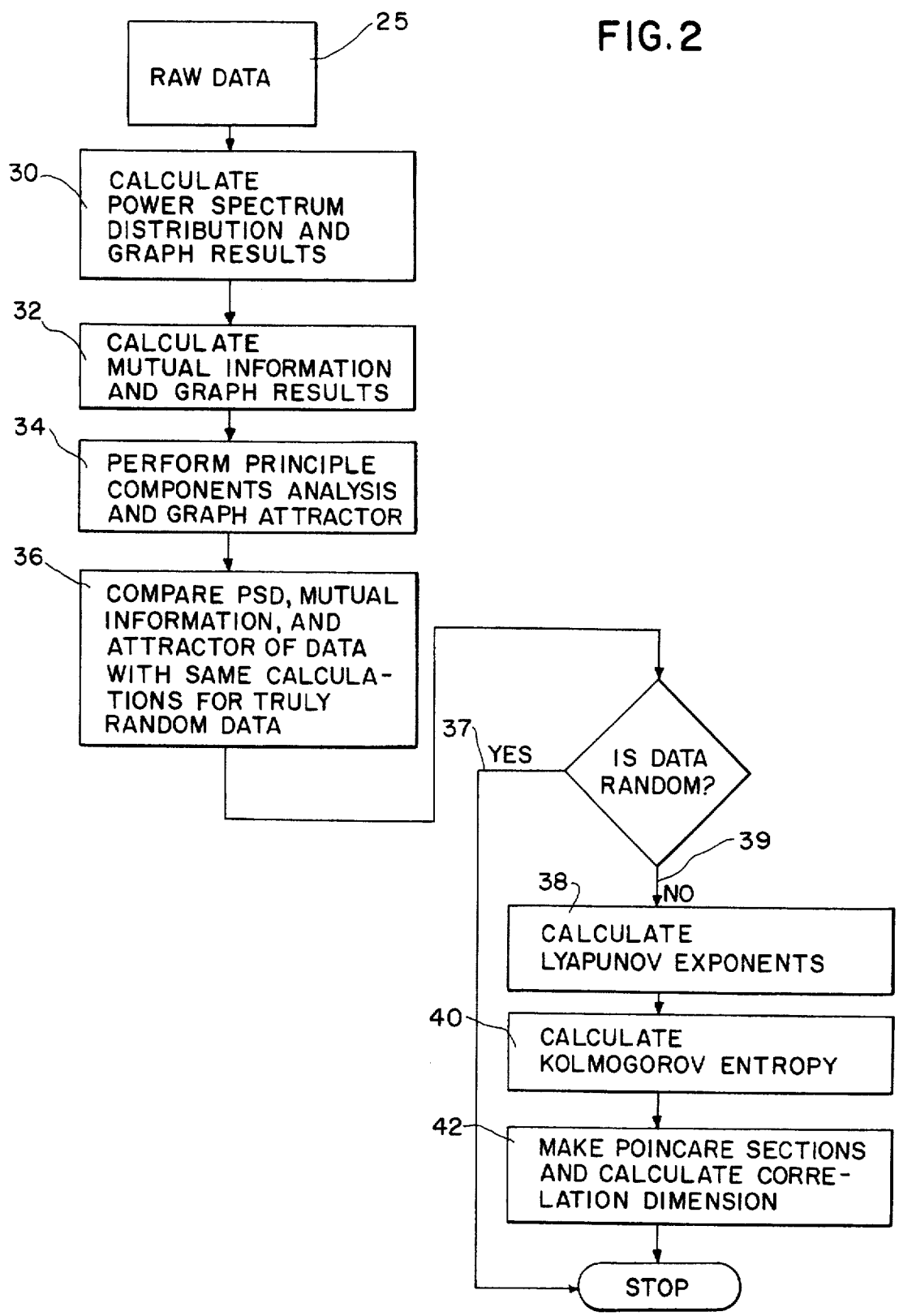
FIG. 2 is a flow chart illustrating the method of the invention.

The raw data obtained from the optical sensor is transformed into a more useful form (i.e. dimensions, entropy) before data analysis is undertaken. This transformation is accomplished using chaotic time series analysis techniques. FIG. 2 is a flow chart of the steps to be undertaken during the chaotic time series transformation of the present invention. A brief description of each step in the flow chart is given below, as well as an illustrative example based on temperature data obtained from a pulverized coal burner.

In the example, chaotic time series analysis was applied to optical pyrometer temperature measurements. The measurements were made on a 6 MBtu/hr pulverized coal combustion pilot facility known as the Small Boiler Simulator (SBS).

Calculate Power Spectrum Distribution

A traditional power spectrum distribution (PSD) is calculated from the raw data 25 and presented graphically at 30. The power spectrum plot gives the square of the voltage (power) versus the number of times (frequency) that a particular value of the power is obtained. Traditional Fourier analysis techniques are valid when the power spectrum distribution exhibits one or more dominant frequency peaks. The validity of Fourier analysis is questionable, however, when the power spectrum distribution lacks dominant peaks. This latter condition is described as being broad-banded and is where chaotic time series analysis is applicable.

Figure 3:
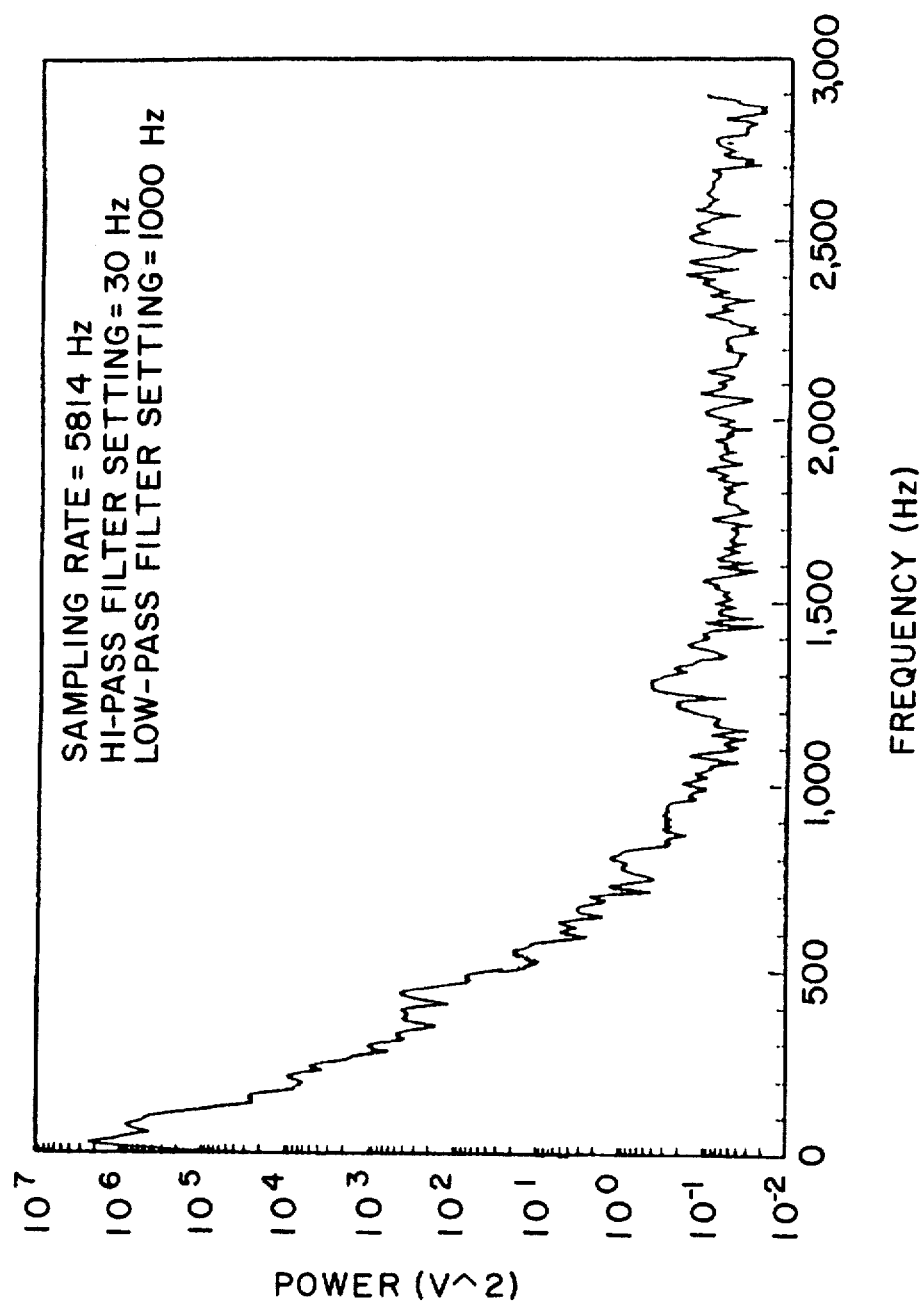
FIG. 3 is a power spectrum distribution graph plotting power against frequency for burner data according to the present invention.

A typical power spectrum distribution (PSD) for chaotic data is shown in FIG. 3. The data shown was taken from optical temperature measurements obtained with a combustor operating under the conditions shown in Table 1 below.

TABLE 1

| SBS Operating Conditions | |
|---|---|
| Fuel | Coal |
| Load (MBtu/hr) | 5.0 |
| Burner Stoichiometry | 1.2 |
| Primary Air/Coal Ratio | 1.8 |
| $O_2$ (%) | 3.4 |
| CO (ppm) | 30 |
| $NO_x$ (ppm) | 240 |

Calculate Mutual Information

A mutual information curve for the raw data is generated at 32. The mutual information describes the general dependence of two variables on one another. In other words, the mutual information describes how much our knowledge of the evolution of one variable affects our knowledge of the evolution of a second variable. The mutual information curve generated shows the amount of information in bits versus the time in steps along the data stream.

Figure 4:
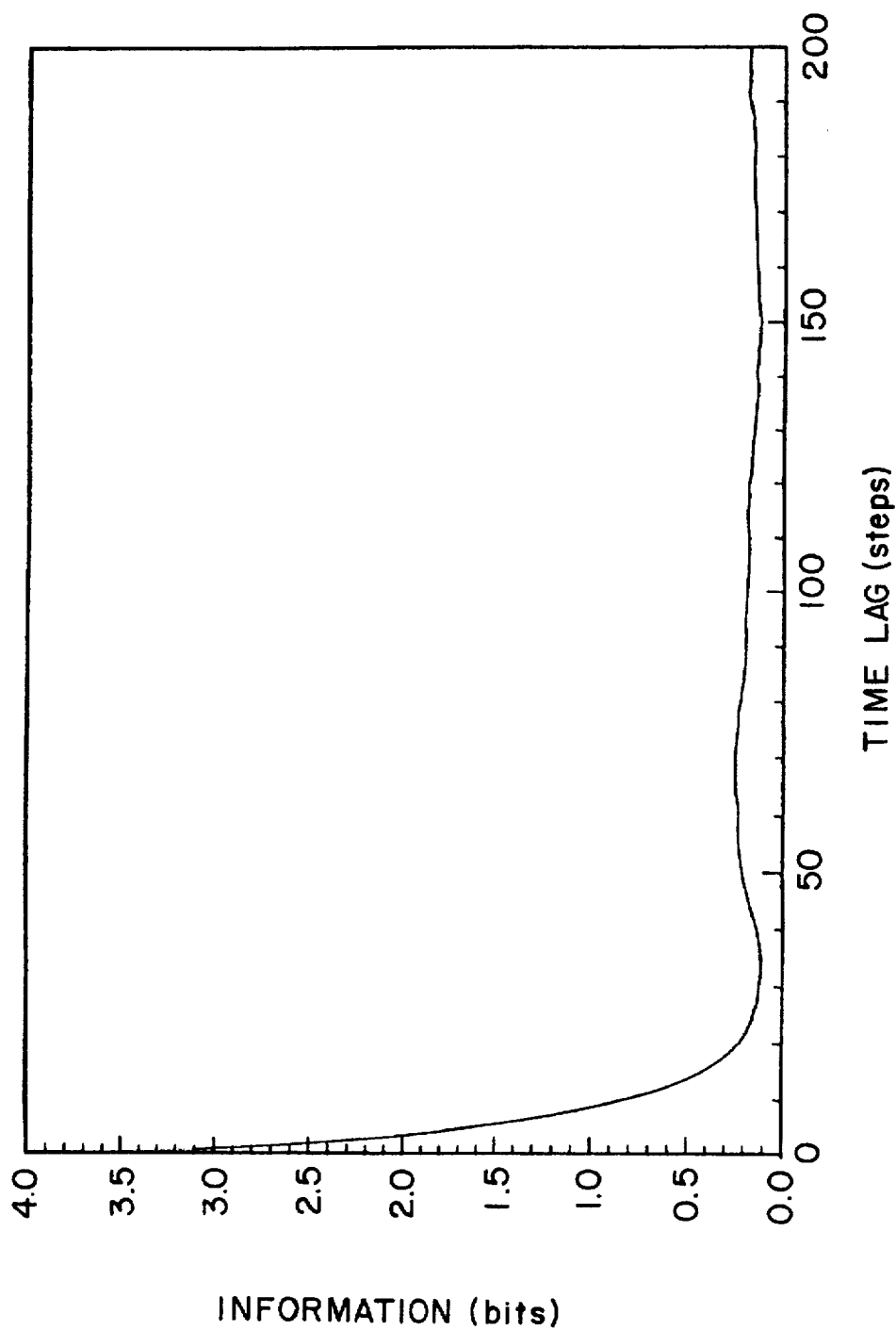
FIG. 4 is a mutual information curve for burner data plotting information against time lag according to the present invention.

A typical mutual information curve based on the optical pyrometer measurements is shown in FIG. 4. The mutual information curve is used to pick the time lag required for subsequent calculations. One convention is to select the optimum time lag corresponding to the first minimum of the mutual information curve.

Perform Principal Components Analysis

A multi-dimensional attractor is reconstructed from the raw data using principal components analysis at 34. The exact method of principal components analysis is described in a paper (7) by Broomhead, D. S., and King, G. P., "*Extracting Qualitative Dynamics from Experimental Data,*", Physica 20D, 1986, pp. 217–236. The attractor graphically describes the overall dynamics of the system under study. The attractor can be used to visually determine the onset of an undesirable operating condition. Small deviations from the desired operating condition will manifest themselves as changes in the shape and size of the attractor.

Figure 5:
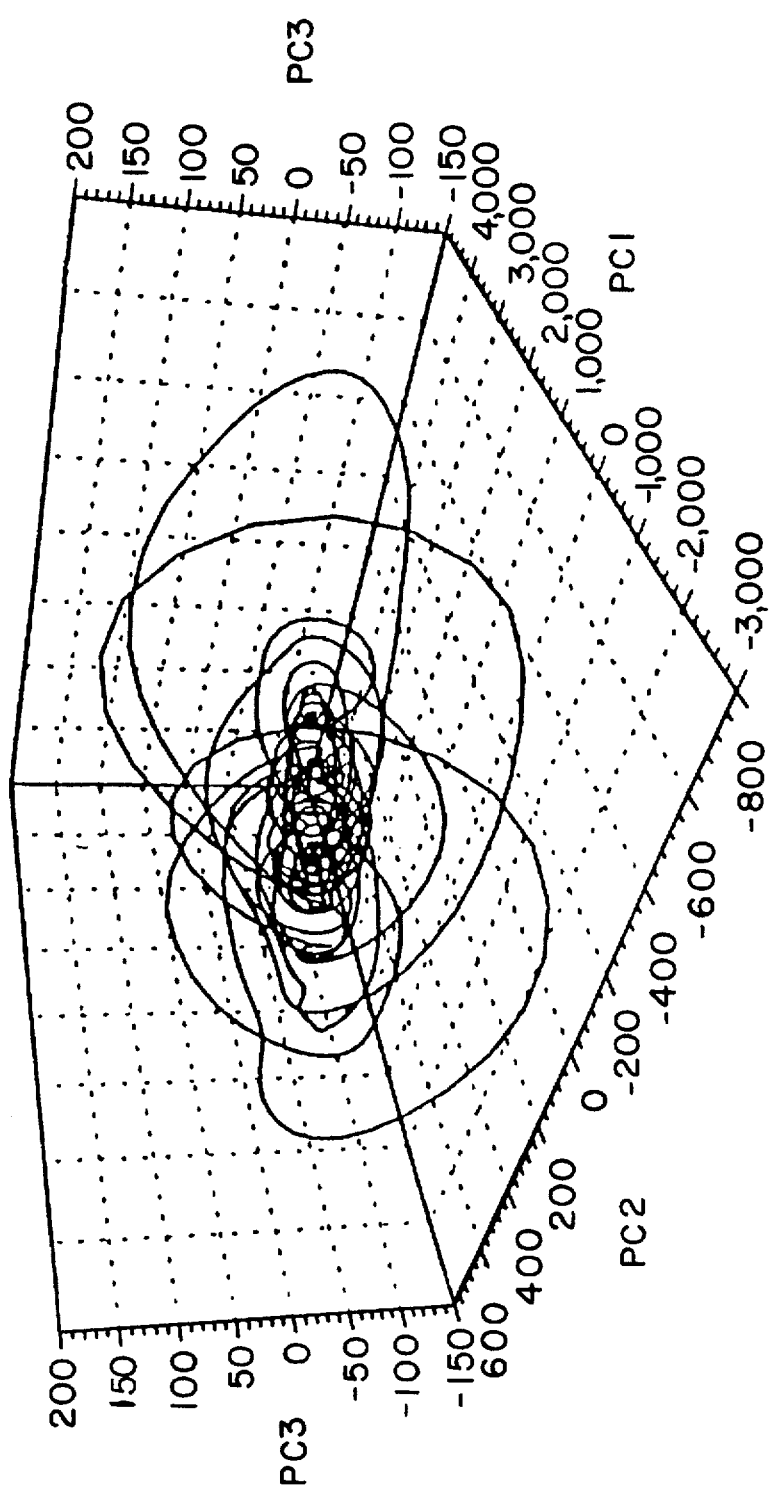
FIG. 5 is a three dimensional chaotic attractor graph for a small boiler simulator (SBS), used in accordance with the present invention.

A 3-D projection of a chaotic attractor is shown in FIG. 5. This attractor was reconstructed from the optical pyrometer time series data set.

Determine If Collected Data Is Random

Figure 6:
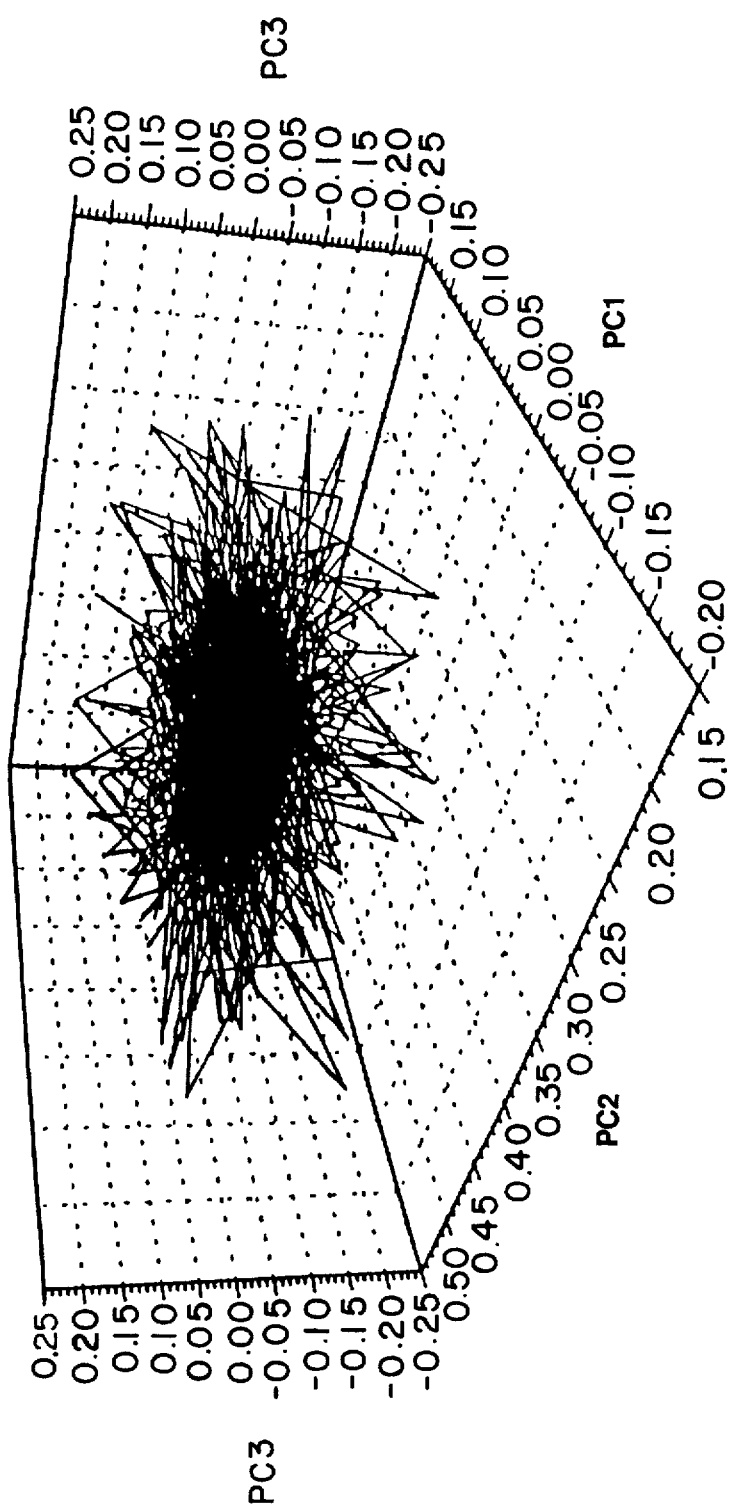
FIG. 6 is a three dimensional chaotic attractor plot of purely random data with is used according to the present invention.

The PSD (power spectrum distribution, FIG. 3), mutual information (FIG. 4), and attractor (FIG. 5) for each data set can be compared at 36 to the PSD, mutual information, and attractor for truly random data. An attractor generated from purely random data is shown in FIG. 6. If the data is random (37 FIG. 2), the present invention is not used. If the data is non-random, chaos theory and the present invention can be used.

Calculate Lyapunov Exponents

One quantitative measure of the shape of the attractor is the Lyapunov spectrum. The Lyapunov spectrum consists of several Lyapunov exponents; one exponent for each dimension of the system. The Lyapunov exponents measure the rate of divergence of trajectories in the attractor (38 FIG. 2).

It is necessary for at least one of the Lyapunov exponents to be positive for the behavior of the system to be deterministically chaotic. If all the exponents are zero or negative, then the system behavior is "ordered" and conventional techniques such as Fourier analysis can be employed.

For the illustrative example, the maximum Lyapunov exponent is 115 Bits/sec.

Calculate Kolmogorov Entropy

The Kolmogorov entropy represents "the inherent memory loss in the system dynamics due to the chaotic components." In other words, the entropy measures the ability to make detailed predictions of the system's future behavior from current information about the state of the system. The Kolmogorov entropy at 40, is another quantitative measure of the shape of the chaotic attractor. Positive values of the entropy are strongly indicative of deterministic chaos. The Kolmogorov entropy is estimated with an adaptation of a procedure by (8) Grassberger, P. and Procaccia, I., "*Estimation of the Kolmogorov Entropy from a Chaotic Signal,*" Physical Review A, Vol. 28, No. 4, October 1983, pp. 2591–2593.

For this example, the value of the Kolmogorov entropy for the example was 121.9 Bits/sec.

Make Poincare Sections and Calculate Correlation Dimension

Another way of graphically representing the dynamics of the system is to take cross sections of the chaotic attractor at different locations. These cross sections are known as Poincare sections and sometimes afford a better view of the dynamics of a complex attractor (42 in FIG. 2).

The creation of Poincare sections aids in the calculation of the correlation dimension. The correlation dimension is a quantitative measure of the chaotic attractor that tells how much phase space is being taken up by the attractor. In other words, the correlation dimension gives some indication of the size of the chaotic attractor. The correlation dimension is calculated using an adaptation of a procedure described by (9) Fraser, A. M., and Swinney, H. L., "*Independent Coordinates for Strange Attractors from Mutual Information,*"

Physical Review A, Vol. 33, No. 2, 1986, p. 1134.

Figure 7:
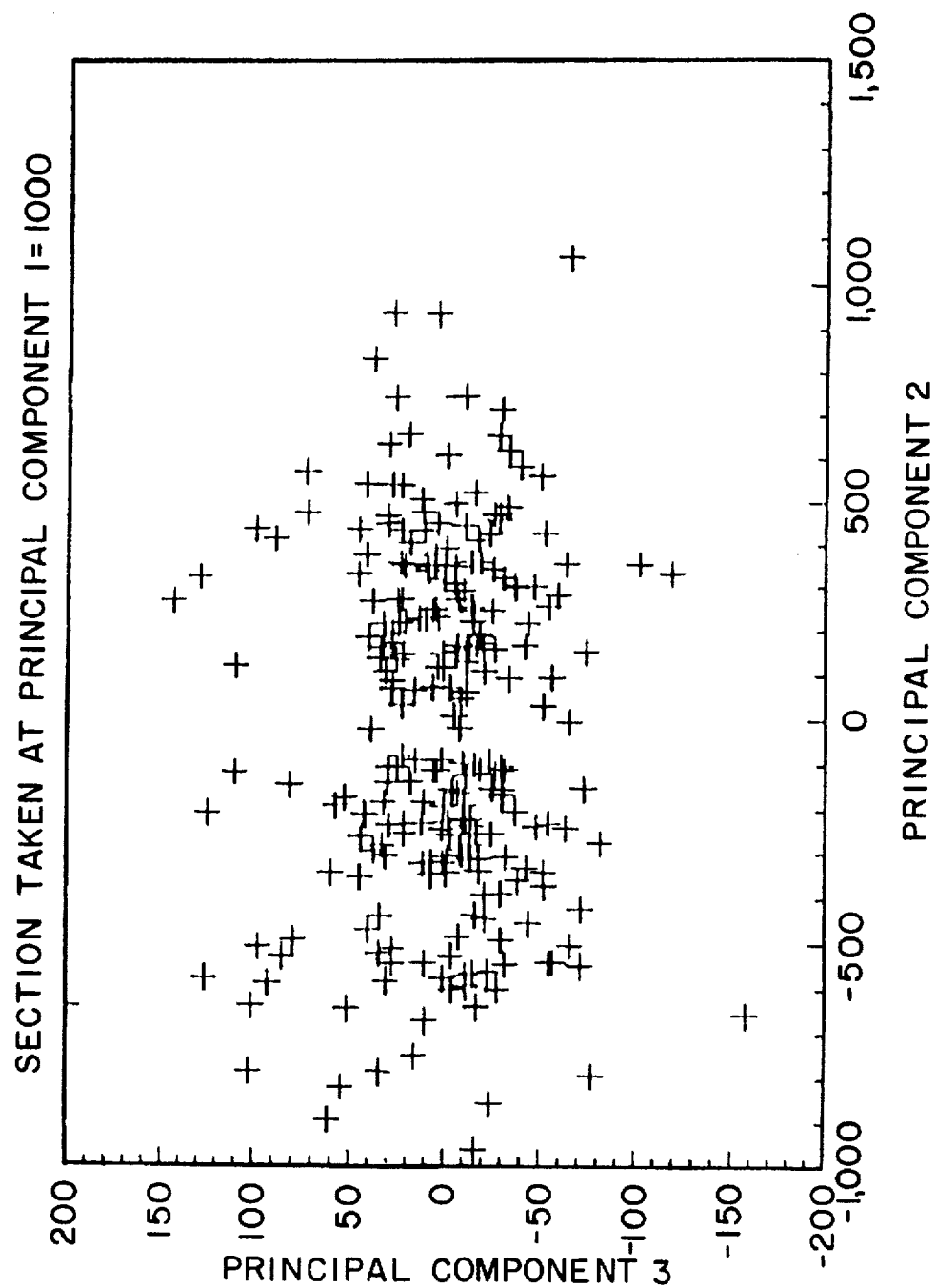
FIG. 7 is a Poincare section for the SBS burner data according to the present invention.

For the subject example, the Poincare graph is shown in FIG. 7, and the correlation dimension is 2.71.

The reduced data is analyzed to determine the relationships between operating conditions and the calculated chaos parameters. In particular, attention is paid to any changes that occur in the visual shape of the attractor or in the quantitative measures of the attractor due to changes in operating condition.

Changes in specific operating parameters too are linked to changes in specific attractor properties. The results of this analysis are used as a monitoring guide to aid boiler operators in the early diagnosis of operating or equipment problems.

FIG. 8 is a schematic representation of a known burner 10 using a probe 12 which can be used in accordance with the invention. The burner 10 shown fires a mixture of primary air and pulverized coal (PA/PC) particles 50 via a tubular burner nozzle 52 which conveys the PA/PC mixture 50 to a frusto-conical burner throat 54 made of water/steam cooled tubes 56 located at an outlet end 58 of the burner 10. The water/steam cooled tubes 56 also form water cooled walls 60 which define a furnace chamber or combustion 62. The tubes 56 are bent out of the plane of the water cooled walls 60 to form the burner throat 54. The tubular burner nozzle 52 extends through a windbox 64 partially defined between a windbox front wall 68 and the furnace wall 60.

A burner barrel 68 extends around the outlet 58 of the tubular burner nozzle 58. Secondary air for combustion of the PA/PC mixture 50 is supplied to the windbox 54 and admitted into the burner barrel 68 by means of an opening 72, and is conveyed via inter and outer annular passageways 74, 76 respectively, to the burner throat 54. An arrangement of inter and outer spin vanes 78, 80 respectively are provided in the inter and outer annular passageways 74, 76 to swirl the secondary air 70 passing therethrough prior to discharge into the burner throat 54. Suitable ignitor devices (not shown) ignite the PA/PC mixture 50 in the vicinity of the burner throat 54 to produce a flame schematically indicated at 82.

The probe 12 provides good optical access to the flame 82 of each burner 10. The probe or flame monitor 12 is a high-temperature fiber optic probe that inserts through the windbox 64, coupled to a silicon photodiode detector 84. The detector 84 can be mounted on the windbox front wall 66, but more advantageously is in some central location (such as the control room) along with the detectors 84 from the probes 12 viewing other flames 82. Optical fibers carry the flame radiation to the central location.

The probe 12 contains a single strand of optical fiber 86 that can withstand temperatures up to 1380° F. Optical fibers having this capability are now commercially available (e.g. Fiberguide Industries—Gold Coated Fibers). Because of the cost of this type of fiber 86, it will be advantageous to use the high temperature optical fiber 86 only for the 2–3 meters that must be mounted in the windbox 64. External to the windbox 64, the high temperature optical fiber 86 can transfer the radiation to a standard (low cost) optical fiber 88 by means of a optical coupling 90 for transmittal to the remote detector 84. The high temperature optical fiber 86 is contained within a pipe 92, such as existing sight tubes or pipes provided on the burners 10. The standard (low cost) optical fiber 88 would likewise be contained within a protective sheath 94.

At an input end 96 of the high temperature optical fiber 86, there are several options depending on the desired field of view. These options are shown in FIGS. 9–12. As shown in FIG. 9, one option is to simply polish the end of the optical fiber 86 so that it collects radiation from the field of view defined by its numerical aperture. A centering ferrule 98 would be provided to center the optical fiber 86 within the pipe 92.

Another option, shown in FIG. 10, would be to use a simple lens 100 to define a field of view either larger or smaller than that defined by its numerical aperture.

Yet another option is to employ a mirror 102, either with or without the lens 100, to change the direction of the field of view. The mirror 102 would typically be made of a material able to withstand the high temperatures to which it is exposed, and could, for example, be a polished stainless steel surface.

Yet still another option is to use a beam steering wedge 104, again either with or without a lens 100, to change the direction of the field of view.

Because the optical fiber 86 can withstand temperatures well above the 800°–900° F. air temperature flowing through the windbox 64, no cooling of the probe 12 is required. The probe 12 can therefore be very small in diameter (⅛" or less) and easily routed to fit in wherever desired.

Advantages of the Invention

The A/F ratio is a function of a complex series of interactions of numerous plant parameters. The result is a complex system with many coupled variables. Because the individual variables are extremely difficult to measure, the invention monitors their effect on the A/F ratio using an easily monitored variable, the optical radiance of the burner flame.

Using chaos analysis on the signal generated by measurement of optical radiance can indicate changes in:

pulverizer wear leading to a change in the size distribution of the coal particles;

change in the overall fuel flow rate from the pulverizer;

change in the distribution among burners of the fuel flow;

change in the distribution of fuel within the flame due to erosion/corrosion of the impeller or conical diffuser;

change in the overall air flow rate;

change in the distribution of air among individual burners; and change of the distribution of air within a given burner due to changes in the positions of air registers.

The availability of an individual burner A/F ratio monitor would be invaluable for use in initial setup of burners in new plants or retrofit units and for day-to-day monitoring of burner performance. On-line monitoring has the potential for tracking and providing early detection of a change in burner characteristics which would allow timely correction of problems prior to experiencing significant changes in efficiency, emissions, slagging, fouling or corrosion.

The fiber optic probes are designed for insertion through the windbox to provide unobstructed wide angle optical access to the flame. Features of the probes include:

mounted through existing optical access ports so no burner modification is necessary;

a special optical fiber is used that can withstand continuous exposure to temperatures up to 1380° F. so no probe cooling is required; and a lens and beam-steering wedge pair combination is used that allows selection of both the size and the direction (relative to the burner axis) of the field of view.

Other unique and non-obvious features and advantages of the invention include the ability to provide virtually unlimited optical access to the flame radiation. There is also freedom of access and this is key to attaining discrimination against adjacent flames which is difficult for a human observer to see. The probe of the invention shown in FIG. 8 also requires no cooling air and allows for detector/electronics to be located remotely, away from the hostile environment burner front wall.

Acoustic monitoring is an alternative to optical monitoring for measuring burner performance. Acoustic waveguides with externally-mounted sensors could be installed at strategic locations through the windbox near the burner and through the furnace walls to practice the present invention.

While a specific embodiment of the invention has been shown and described in detail to illustrate the application of the principles of the invention, it will be understood that the invention may be embodied otherwise without departing from such principles.

What is claimed is:

1. A method of analyzing and controlling parameters affecting a burner flame using chaos theory analysis, comprising:

accumulating raw data representing at least one characteristic of the flame, over time;

calculating a power spectrum distribution for the raw data;

calculating a mutual information curve for the raw data;

calculating a multi-dimensional attractor from the raw data using principal components analysis;

comparing the power spectrum distribution, mutual information curve and multi-dimensional attractor for the raw data with a power spectrum distribution, mutual information curve and multi-dimensional attractor for truly random data and continuing said analysis and control of said parameters if said comparison determines that the accumulated raw data is non-random;

calculating Lyapunov exponents for each dimension of the attractor for providing an indication of a rate of divergence of trajectories of the attractor;

calculating Kolmogorov entropy to provide an indication of the ability to make detail predictions concerning the raw data, positive values for the Kolmogorov entropy indicating strong chaotic behavior;

taking at least one cross section of the chaotic attractor at at least two different locations as a quantitative measure of the chaotic attractor;

at least one of Lyapunov exponents, Kolmogorov entropy and cross section of the attractor being a signal indicative of flame quality; and using the signal to control at least one parameter of the burner to adjust the flame.

2. A method according to claim 1 wherein the power spectrum is taken in the frequency domain and the mutual information is taken in the time domain.

3. A method according to claim 1 wherein the raw data comprises flame radiation, the raw data being taken using an optical probe for viewing the flame radiation.

4. The method according to claim 1, including transmitting the signal to a display means for viewing by an operator.

5. An apparatus for analyzing and controlling burner parameters affecting a combustion flame based on chaos theory analysis, comprising:

means for accumulating raw data representing at least one characteristic of the flame, over time;

means for calculating a power spectrum distribution for the raw data;

means for calculating a mutual information curve for the raw data;

means for calculating a multi-dimensional attractor from the raw data using principal components analysis;

means for comparing the power spectrum distribution, mutual information curve and multi-dimensional attractor for the raw data with a power spectrum distribution, mutual information curve and multi-dimensional attractor for truly random data, said comparing means being operative to permit analysis and control of said burner parameters if said accumulated raw data is non-random;

means for calculating Lyapunov exponents for each dimension of the attractor for providing an indication of a rate of divergence of trajectories of the attractor;

means for calculating a Kolmogorov entropy to provide an indication of the ability to make detail predictions concerning the raw data, positive values for the Kolmogorov entropy indicating strong chaotic behavior;

means for taking at least one cross section of the chaotic attractor at at least two different locations as a quantitative measure of the chaotic attractor; and means connected to at least one of the means for calculating the Lyapunov exponents, means for calculating a Kolmogorov entropy and means for taking at least one cross section, for producing a control signal, and control means connected for receiving the control signal to adjust at least one burner parameter affecting the flame.

6. An apparatus according to claim 5 wherein the means for calculating the power spectrum calculates the power spectrum in the frequency domain.

7. An apparatus according to claim 5 wherein the means for calculating the mutual information is taken in the time domain.

8. An apparatus according to claim 5, including means for displaying said quantitative measure of the chaotic attractor for viewing by an operator.

9. An apparatus according to claim 5 comprising a fiberoptic probe for taking the raw data as a measurement of flame radiation.

10. An apparatus according to claim 9, wherein the fiberoptic probe comprises a high temperature optical fiber having an input end for viewing the flame which is polished so that it collects radiation from a field of view defined by its numerical aperture.

11. An apparatus according to claim 9, wherein the fiberoptic probe comprises a high temperature optical fiber having an input end and a lens.

12. An apparatus according to claim 9, wherein the fiberoptic probe comprises a high temperature optical fiber having an input end and a mirror.

13. An apparatus according to claim 9, wherein the fiberoptic probe comprises a high temperature optical fiber having an input end and a beam steering wedge.

14. A method of monitoring a burner flame using chaos theory analysis to determine how changes in burner adjustment parameters affect the burner flame, comprising:

using fiber optic probe means to view flame radiation produced by the flame;

accumulating raw data representative of optical radiance of the flame, over time, by coupling photodiode detector means to said fiber optic probe means to produce signals representative of the flame radiation, filtering said representative signals, digitizing said filtered signals, and providing said digitized, filtered signals to computer means;

calculating a power spectrum distribution for the raw data;

calculating a mutual information curve for the raw data;

calculating a multi-dimensional attractor from the raw data using principal components analysis;

comparing the power spectrum distribution, mutual information curve and multi-dimensional attractor for the raw data with a power spectrum distribution, mutual information curve and multi-dimensional attractor for truly random data and continuing said monitoring of the burner flame using chaos theory analysis if said comparison determines that the accumulated raw data is non-random;

calculating Lyapunov exponents for each dimension of the attractor for providing an indication of a rate of divergence of trajectories of the attractor;

calculating Kolmogorov entropy to provide an indication of the ability to make detail predictions concerning the raw data, positive values for the Kolmogorov entropy indicating strong chaotic behavior;

taking at least one cross section of the chaotic attractor at at least two different locations as a quantitative measure of the chaotic attractor;

at least one of Lyapunov exponents, Kolmogorov entropy and cross section of the attractor being a signal indicative of flame quality; and transmitting the signal to a display means for viewing by an operator, changes occurring in the visual shape of the attractor or in the quantitative measure of the attractor being representative of changes in said burner adjustment parameters.

15. An apparatus for monitoring a burner flame using chaos theory analysis to determine how changes in burner adjustment parameters affect the burner flame, comprising:

fiber optic probe means for viewing flame radiation produced by the flame;

means for accumulating raw data representative of the flame radiation, over time, wherein said data accumulating means includes photodiode detector means, coupled to said fiber optic probe means, for producing signals representative of the flame radiation, filter means for filtering said representative signals, analog-to-digital converter means for digitizing said filtered signals, and computer means for receiving said digitized, filtered signals;

means for calculating a power spectrum distribution for the raw data;

means for calculating a mutual information curve for the raw data;

means for calculating a multi-dimensional attractor from the raw data using principal components analysis;

means for comparing the power spectrum distribution, mutual information curve and multi-dimensional attractor for the raw data with a power spectrum distribution, mutual information curve and multi-dimensional attractor for truly random data, said comparing means being operative to permit said monitoring of the burner flame using chaos theory analysis to continue if said accumulated raw data is non-random;

means for calculating Lyapunov exponents for each dimension of the attractor for providing an indication of a rate of divergence of trajectories of the attractor;

means for calculating a Kolmogorov entropy to provide an indication of the ability to make detail predictions concerning the raw data, positive values for the Kolmogorov entropy indicating strong chaotic behavior;

means for taking at least one cross section of the chaotic attractor at at least two different locations as a quantitative measure of the chaotic attractor; and means for displaying said quantitative measure of the chaotic attractor for viewing by an operator, changes in said quantitative measures of the chaotic attractor being representative of changes in adjustment parameters affecting the burner flame.

* * * * *

UNITED STATES PATENT AND TRADEMARK OFFICE
CERTIFICATE OF CORRECTION

PATENT NO. : 5,465,219
DATED : November 7, 1995
INVENTOR(S) : Larry A. Jeffers, et al.

It is certified that error appears in the above-indentified patent and that said Letters Patent is hereby corrected as shown below:

On the cover at Item [75] add the following:

--Timothy A. Fuller, N. Canton and Thomas J. Flynn, N. Canton, both of Ohio--

Signed and Sealed this

Twenty-third Day of April, 1996

Attest:

Attesting Officer

BRUCE LEHMAN

Commissioner of Patents and Trademarks